(12) United States Patent
Natsuhara et al.

(10) Patent No.: US 7,306,858 B2
(45) Date of Patent: Dec. 11, 2007

(54) ALUMINUM NITRIDE SINTERED BODY

(75) Inventors: Masuhiro Natsuhara, Itami (JP); Kenji Shinma, Itami (JP); Hirohiko Nakata, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/198,009

(22) Filed: Aug. 4, 2005

(65) Prior Publication Data
US 2006/0035107 A1   Feb. 16, 2006

(30) Foreign Application Priority Data
Aug. 4, 2004 (JP) ............................. 2004-227393

(51) Int. Cl.
*B32B 9/00* (2006.01)
(52) U.S. Cl. .................... 428/698; 219/444.1; 219/546
(58) Field of Classification Search ................ 428/698; 219/444.1, 546
See application file for complete search history.

(56) References Cited

U.S. PATENT DOCUMENTS

| | | | | |
|---|---|---|---|---|
| 5,677,052 A | * | 10/1997 | Shimoda et al. | ............ 428/336 |
| 5,955,148 A | * | 9/1999 | Shimoda et al. | ......... 427/376.1 |
| 6,174,614 B1 | * | 1/2001 | Yushio et al. | ................ 428/698 |
| 6,387,551 B1 | * | 5/2002 | Nishioka et al. | ............ 428/698 |

FOREIGN PATENT DOCUMENTS

JP   11-074064 A   3/1999

* cited by examiner

*Primary Examiner*—John J. Zimmerman
*Assistant Examiner*—Aaron Austin
(74) *Attorney, Agent, or Firm*—Darby & Darby

(57) ABSTRACT

In an aluminum nitride sintered body, the bismuth and chlorine contents are restricted to be no more than fixed amounts. More specifically, in an aluminum nitride sintered body having aluminum nitride as its main component, the bismuth content in the aluminum nitride sintered body is no more than 30 ppm and the chlorine content is no more than 100 ppm. It would be preferable to form a resistance heating body on the aluminum nitride sintered body, and it would be preferable for the aluminum nitride sintered body to be used as a semiconductor heating part.

4 Claims, No Drawings

ALUMINUM NITRIDE SINTERED BODY

INCORPORATION BY REFERENCE

The present application claims priority under 35 U.S.C. § 119 to Japanese Patent Application No. 2004-227393 filed on Aug. 4, 2004 in the Japanese language, which is hereby incorporated by reference in its entirety.

TECHNICAL FIELD

The present invention relates to an aluminum nitride sintered body used in circuit substrates and semiconductor fabrication device parts. More specifically, the present invention relates to an aluminum nitride sintered body suitable for use in a susceptor for heating semiconductor wafers and the like.

BACKGROUND ART

Conventionally, aluminum nitride sintered bodies have been used for circuit substrates and the like because they have high thermal conductivity and a thermal expansion coefficient relatively close to that of silicon. In recent years, the use of aluminum nitride has been proposed for heaters for semiconductor wafers used to form conductive films, insulative films, and resist films on semiconductor wafers and for etching semiconductor wafers as well as for inspecting semiconductor wafers. In these applications, the temperature distribution of the semiconductor wafer has a significant effect on product characteristics, resulting in a requirement that the temperature distribution on the semiconductor wafer surface be as uniform as possible. Thus, aluminum nitride, which has a relatively high thermal conductivity, is used.

For example, in Japanese Laid-Open Patent Publication Number Hei 11-74064, a metal paste such as tungsten or molybdenum is applied through screen-printing to serve as a resistance heating body on ceramics such as aluminum nitride. This is then sintered to provide a wafer heating device with an embedded resistance heating body.

In this type of wafer heating device, the metal paste is screen-printed on ceramics to serve as a resistance heating body, but pores and the like on the ceramics surface can cause pattern smearing and pinhole formation during printing. Also, when pores are present in the ceramics, they can hinder the transmission of heat from the resistance heating body to the wafer mounting surface, reducing the uniformity of the temperature distribution of the wafer.

DISCLOSURE OF INVENTION

The object of the present invention is to overcome the problems described above and to provide a susceptor with superior thermal uniformity by reducing pores in the aluminum nitride sintered body as much as possible.

In an aluminum nitride sintered body according to the present invention, the bismuth and chlorine content are set to be no more than fixed values. More specifically, in an aluminum nitride sintered body having aluminum nitride as its main component, the bismuth content in the aluminum nitride sintered body is no more than 30 ppm and the chlorine content is no more than 100 ppm.

It would be preferable to form a resistance heating body on the aluminum nitride sintered body so that it can be used as a semiconductor heating part.

Best Mode for Carrying Out the Invention

In aluminum nitride (AlN) sintered bodies, pores are generally present to some degree inside and on the surface thereof.

When, for example, a resistance heating circuit is screen-printed on an aluminum nitride sintered body, these pores can lead to circuit pattern smearing and pinholes. Also, even if no circuit pattern smears or pinholes are formed, the pores on the surface can burst due to thermal expansion when baking the resistance heating body, leading to circuit breaks. Also, when a resistance heating body circuit is formed on an aluminum nitride shaped body, e.g., a green sheet, and sintered, pores are present inside the aluminum nitride sintered body and at the boundary surface with the resistance heating body. Also, when a coil, e.g., a molybdenum coil, is embedded in aluminum nitride powder and sintered to form a resistance heating body circuit, pores will be present in the aluminum nitride sintered body and at the boundary surface with the coil.

Susceptors (wafer support bodies) used in semiconductor fabrication devices and inspections devices generally tend to be formed with ceramic sintered bodies, using aluminum nitride sintered bodies formed with resistance heating bodies as described above. In semiconductor fabrication devices and inspection devices, a wafer is heated and various operations and inspections are performed. Since the temperature distribution of the wafer affects wafer characteristics and yield, it is very important that the wafer temperature distribution is uniform.

Thus, the resistance heating body circuit described is designed precisely using simulations and the like and is implemented by application through screen-printing and the like, the embedding of metal coils, and the like so that there is a high degree of control over the thickness and the positioning of the resistance heating body circuit to achieve at least a fixed degree of thermal uniformity.

However, when implementation involves application such as screen-printing, the presence of pores as described above results in localized variations in line width and film thickness of the resistance heating body circuit. This leads to localized variations in the resistance values of the resistance heating body circuit, leading to heat generation that is not consistent with design values. When the amount of heat generated is not consistent with design values, the temperature distribution of the wafer mounting surface of the susceptor is inferior. Also, if a coil is used, pores with the boundary surface with the coil hinder the transmission of heat, reducing the uniformity of the temperature distribution of the wafer mounting surface.

In either case, pores in the sintered body hinder the transmission of heat from the heat-generating body to the wafer mounting surface, leading to non-uniform temperature distribution of the wafer mounting surface. For example, when pores are present on the wafer mounting surface and the wafer is mounted on the wafer mounting surface either directly or at a distance of no more than approximately 0.2 mm, the transfer of heat is hindered directly above the pore, thus tending to reduce the temperature directly above the pore.

Even with susceptors with no resistance heating body, if a corrosive gas is used the presence of pores on the surface results in corrosion at the pore areas, leading to the creation of particles.

The present inventors performed a detailed analysis of pores in aluminum nitride sintered bodies and determined that trace amounts of bismuth and chlorine are present at the pores. The relationship between bismuth and chlorine content and the number of pores in the sintered body was studied, and it was determined that the number of pores in the aluminum nitride sintered body can be reduced to a degree that is negligible in practice if the bismuth content is no more than 30 ppm and the chlorine content is no more than 100 ppm.

While reducing one or the other of bismuth content and chlorine content provides some advantages, reducing both makes it possible to provide an aluminum nitride sintered body with superior thermal uniformity. While completely eliminating bismuth and chlorine from the aluminum nitride sintered body is difficult, the content range described above can be achieved by using material with less bismuth and chlorine in the raw powder for the aluminum nitride and a sintering aid. Even if the amounts of bismuth and chlorine in the raw powder exceed 30 ppm and 100 ppm respectively, volatilization takes place during sintering so that the contents in the sintered body can be at or less than 30 ppm and 100.

While the mechanism by which bismuth and chlorine content relate to the presence of pores in aluminum nitride sintered bodies is not clear, the present inventors surmise the following. Trace amounts of bismuth and chlorine compounds in the raw aluminum nitride powder or mixed in during production form vapor, e.g., $BiCl_3$ vapor, during the production process of the aluminum nitride sintered body. Pores are formed when this vapor volumetrically expands. Also, if the surface of the aluminum nitride sintered body is abraded and a resistance heating body circuit is formed on the abraded surface, the presence of bismuth and chlorine at the openings of the pores cause the bismuth and chlorine to react with the metal forming the resistance heating body when the metal paste is applied and baked, especially when the metal is tungsten or molybdenum. This results in problems such as localized discoloration of the resistance heating body circuit.

It would be preferable for the raw AlN powder to have a specific surface area of 2.0-5.0 $m^2/g$. If the specific surface area is less than 2.0 $m^2/g$, the quality of the sintering of the aluminum nitride is reduced. Also, if the specific surface area exceeds 5.0 $m^2/g$, the agglomeration of the powder becomes extremely pronounced, making handling difficult. Furthermore, it would be preferable for the amount of oxygen contained in the raw powder to be no more than 2 percent by weight. If the amount of oxygen exceeds 2 percent by weight, the thermal conductivity of the sintered body. Also, it would be preferable for the amount of metal impurities other than aluminum contained in the raw powder to be no more than 2000 ppm. If the amount of metal impurities exceeds this range, the thermal conductivity of the sintered body is reduced. Among metal impurities, group IV elements such as Si and ferrous elements such as Fe especially reduce the thermal conductivity of the sintered body, so it would be preferable for the contents thereof to be no more than 500 ppm each respectively.

Since AlN is a material that is difficult to sinter, it would be preferable for a sintering aid to be added to the raw AlN powder. It would be preferable for the sintering aid that is added to be a rare-earth element compound. Rare-earth element compounds can improve the thermal conductivity of the aluminum nitride sintered body by reacting with aluminum oxide or aluminum oxynitride present at the surfaces of aluminum nitride powder particles during sintering so that the densification of aluminum nitride is promoted while also removing oxygen, which is a factor in reducing thermal conductivity of the aluminum nitride sintered body.

It would be preferable for the rare-earth element compound to be a yttrium compound, which is especially effective in removing oxygen. It would be preferable for the amount added to be 0.01-5 percent by weight. If the amount is less than 0.01 percent by weight, obtaining a dense sintered body is difficult and the thermal conductivity of the sintered body is reduced. Also, if the amount exceeds 5 percent by weight, sintering aid will be present at grain boundaries of the aluminum nitride sintered body so that if a corrosive atmosphere agent is used, the sintering aid present at the grain boundaries is etched, resulting in loose grains and particles. Furthermore, it would be more preferable for the amount of sintering aid added to be no more than 1 percent by weight. If the amount is no more than 1 percent by weight, sintering aid will not be present at the triple point of the grain boundaries, thus improving corrosion resistance.

For the rare-earth element compound, it would also be possible to use oxides, nitrides, fluorides, stearates, and the like. Of these, oxides are preferable because they are inexpensive and easily obtained. Also, stearates have a high affinity with organic solvents, making them preferable if raw aluminum nitride powder and sintering aid and the like are to be mixed with an organic solvent since the quality of the mixing will be improved.

Next, to the raw aluminum nitride powder and sintering aid are added predetermined amounts of solvent and binder as well as dispersant and flocculent if needed, and these are mixed together. Mixing can be performed with a ball mill, ultrasound, or the like. This mixing operation results in a raw slurry.

The obtained slurry is shaped and sintered to form an aluminum nitride sintered body. This can be done using a co-firing method or a post-metallizing method.

First, the post-metallizing method will be described. Using a spray dryer or the like on the slurry, granules are formed. These granules are inserted in a predetermined die and pressed. It would be preferable for the press pressure to be at least 9.8 MPa. An adequate strength of the shaped body will often not be obtained if the pressure is less than 9.8 MPa, resulting in a tendency to break due to handling and the like.

The density of the shaped body varies according to the binder content and the amount of sintering aid added, but it would be preferable for the density to be at least 1.5 $g/cm^3$.

If the density is less than 1.5 g/cm³, the distance between raw powder particles becomes relatively large, hindering sintering. It would be preferable for the shaped body density to be no more than 2.5 g/cm³. If the density exceeds 2.5 g/cm³, it becomes difficult to adequately remove binder in the shaped body in the subsequent degreasing step. This makes it difficult to obtain a dense sintered body as described above.

Next, the shaped body is heated in a non-oxidizing atmosphere and degreasing is performed. If degreasing is performed in an oxidizing atmosphere such as the open air, the surfaces of the AlN powder oxide, reducing the thermal conductivity of the sintered body. It would be preferable for the non-oxidizing atmosphere gas to be nitrogen or argon. It would be preferable for the heating temperature used for degreasing to be at least 500 deg C. and no more than 1000 deg C. If the temperature is less than 500 deg C., the binder cannot be adequately removed, resulting in excessive carbon residue in the layered body after degreasing, which hinders subsequent sintering. Also, if the temperature exceeds 1000 deg C., the amount of residual carbon is too low, reducing the ability to remove oxygen of the oxidation film on the AlN powder surfaces and reducing the thermal conductivity of the sintered body.

Also, it would be preferable for the amount of carbon left in the shaped body after degreasing to be no more than 1.0 percent by weight. If more than 1.0 percent by weight of carbon is left, sintering is hindered, preventing the formation of a dense sintered body.

Next, sintering is performed. Sintering is performed in a non-oxidizing atmosphere such as nitrogen or argon at a temperature of 1700-2000 deg C. It would be preferable for the moisture in the atmosphere gas such as nitrogen gas to be no more than −30 deg C. at dew point. If there is more moisture, the AlN reacts with the moisture in the atmosphere gas during sintering to form oxynitrides, and the thermal conductivity may be reduced. Also, it would be preferable for the amount of oxygen in the atmosphere gas to be no more than 0.001 percent by volume. If there is more oxygen, the AlN surfaces are oxidized and the thermal conductivity may be reduced.

Furthermore, a boron nitride (BN) shaped body is suitable as a tool used during sintering. A BN shaped body has adequate heat resistance for the sintering temperature and the surface thereof has solid lubrication properties, thus making it possible to reduce the friction between the tool and the layered body when the layered body contracts during sintering, making it possible to obtain a sintered body with minimal deformation.

The obtained sintered body is processed as needed. If a conductive paste is to be screen-printed in the next step, it would be preferable for the surface roughness of the sintered body to have an Ra of no more than 5 microns. If the Ra exceeds 5 microns, defects such as pattern smearing and pinholes tend to occur when the circuit is screen-printed. It would be more preferable for the surface roughness to have an Ra of no more than 1 micron.

When the surface roughness is to be achieved by abrasion, both surfaces of the sintered body should of course be abraded if both surfaces are to be screen-printed. However, if screen-printing is to be performed only on one surface, the surface opposite from the surface to be screen-printed should also be abraded. If only the surface to be screen-printed is abraded, the sintered body would be supported on the unabraded surface during screen-printing. Projections and contaminants may be present on the unabraded surface, resulting in the sintered body being secured in an unstable manner and preventing proper rendering of the screen-printed circuit pattern.

Also, it would be preferable for the degree of parallelization of the processed surfaces to be no more than 0.5 mm. If the degree of parallelization exceeds 0.5 mm, there may be significant variation in the thickness of conductive paste during screen-printing. It would be more preferable for the degree of parallelization to be no more than 0.1 mm. Furthermore, it would be preferable for the flatness of the surface to be screen-printed to be no more than 0.5 mm. If the flatness exceeds 0.5 mm, there can be significant variation in the thickness of the conductive paste. It would be more preferable for the flatness to be no more than 0.1 mm.

The conductive paste is screen-printed onto the abraded sintered body to form the electrical circuit. The conductive paste can be obtained by mixing the metal powder with solvent and binder and an oxide powder as needed. In order to match thermal expansion coefficient with the ceramics, it would be preferable for the metal powder to be tungsten or molybdenum or tantalum.

Also, in order to improve adhesion strength with AlN, oxide powder can be added. For the oxide powder, an oxide of a group IIa element or a group IIIa element or $Al_2O_3$, $SiO_2$, or the like is preferable. In particular, yttrium oxide has extremely good wettability with regard to AlN and is preferable. It would be preferable for the amount of oxide added to be 0.1-30 percent by weight. If the amount is less than 0.1 percent by weight, adhesion strength between the AlN and the metal layer forming the electrical circuit is reduced. Also, if the amount exceeds 30 percent by weight, the electrical resistance of the metal layer forming the electrical circuit increases.

It would be preferable for the thickness of the conductive paste to be at least 5 microns and no more than 100 microns after drying. If the thickness is less than 5 microns, the electrical resistance becomes too high and adhesion strength is reduced. Also, if the thickness exceeds 100 microns, the adhesion strength is reduced.

Also, if the circuit pattern to be formed is a heater circuit (heat-generating body circuit), it would be preferable for the pattern pitch to be at least 0.1 mm. If the pitch is less than 0.1 mm, the current flowing through the heat-generating body may leak depending on the applied voltage and the temperature, resulting in a short-circuit. In particular, if the structure is to be used at a temperature of at least 500 deg C., it would be preferable for the pattern pitch to be at least 1 mm and more preferable at least 3 mm.

After the conductive paste is degreased, baking is performed. Degreasing is performed in a non-oxidizing atmosphere such as nitrogen or argon. It would be preferable for the degreasing temperature to be at least 500 deg C. If the temperature is less than 500 deg C., elimination of the binder and the conductive paste is inadequate, leaving behind carbon in the metal layer and resulting in the formation of metal carbides when baking is performed. This leads to an increased electrical resistance for the metal layer.

It would be preferable for baking to be performed in a non-oxidizing atmosphere such as nitrogen or argon at a temperature of at least 1500 deg C. At a temperature of less than 1500 deg C., the grain growth of the metal powder in the conductive paste is hindered, resulting in an electrical resistance of the metal layer that is too high after baking. Also, it would be preferable for the baking temperature to not exceed the sintering temperature of the ceramics. If the conductive paste is baked at a temperature exceeding the sintering temperature of the ceramics, the sintering aid and the like in the ceramics begin to volatilize and the grain growth of the metal powder in the conductive paste is promoted, resulting in reduced adhesion strength of the ceramics with the metal layer.

Next, in order to provide insulation for the formed metal layer, an insulative coat can be formed on the metal layer. There are no particular restrictions on the material used for the insulative coat as long as it has low reactivity with the electrical circuit and the difference in the thermal expansion coefficient with that of AlN is no more than $5.0 \times 10^{-6}$. For example, glass ceramics, AlN, or the like can be used. These materials can be used, for example, to form a paste that is screen-printed to a predetermined depth and baked at a predetermined temperature after degreasing if needed.

It would be preferable for the amount of sintering aid added to be at least 0.01 percent by weight. If the amount is less than 0.01 percent by weight, the insulative coat does not densify, making it difficult to provide insulation for the metal layer. Also, it would be preferable for the amount of sintering aid to not exceed 20 percent by weight. If the amount exceeds 20 percent by weight, the excess sintering aid impregnates the metal layer, which can lead to changes in the resistance of the metal layer. There are no special restrictions on the application thickness, but it would be preferable for the thickens to be at least 5 microns. If the thickness is less than 5 microns, providing insulation becomes difficult.

Also, it would be possible to use mixtures or alloys of silver, palladium, or platinum, or the like as the conductive paste. With these metals, the volume resistivity of the conductor increases according to the amount of palladium or platinum added relative to the silver content, so the amount added should be adjusted according to the circuit pattern. Also, these additives serve to prevent migration between circuit patterns, so it would be preferable for at least 0.1 parts by weight to be added per 100 part by weight of silver.

In order for the metal powder to maintain adhesiveness with AlN, it would be preferable to add a metal oxide. For example, aluminum oxide, silicon oxide, copper oxide, boron oxide, zinc oxide, lead oxide, rare-earth oxides, transitional metal element oxides, alkali-earth metal oxides, and the like can be added. It would be preferable for the amount added to be at least 0.1 percent by weight and no more than 50 percent by weight. If the amount is less, the adhesiveness to aluminum nitride is reduced. If the amount is more, sintering of metal components such as silver is hindered.

The metal powder and inorganic powder are mixed, organic solvent and binder are added, a paste is prepared, and a circuit is formed by screen-printing the paste in the same manner as described above. In this case, the formed circuit pattern is baked in an inert gas atmosphere such as nitrogen or in the open air in a temperature range of 700 deg C. to 1000 deg C.

Furthermore, in this case, an insulation layer can be formed to provide insulation between circuits by applying and baking or curing glass ceramics, glazed glass, organic resin, or the like. Types of glass that can be used include borosilicate glass, lead oxide, zinc oxide, aluminum oxide, silicon oxide, or the like. Organic solvent and binder are added to the powder to form a paste, which is then screen-printed. There are no special restrictions on the application thickness but it would be preferable for the thickness to be at least 5 microns. If the thickness is less than 5 microns, providing insulation becomes difficult. Also, it would be preferable for the baking temperature to be lower than the temperature used for circuit formation. If baking takes place at a temperature higher than that used for baking the circuit, there may be large changes in the resistance of the circuit pattern.

Next, a ceramic substrate can be layered as needed. The layering should be performed with an adhesive agent. The adhesive agent is formed by adding a group IIa element compound or a group IIIa element compound and a binder and solvent to aluminum oxide powder or aluminum nitride powder and forming a paste, which is then applied by screen-printing onto the mounting surface. There are no special restrictions on the application thickness of the bonding agent, but it would be preferable for the thickness to be at least 5 microns. If the thickness is less than 5 microns, bonding defects such as pinholes and uneven bonding and the like tend to take place in the bonding layer.

The ceramic substrate on which the bonding agent is applied is degreased in a non-oxidizing atmosphere at a temperature of at least 500 deg C. Then, the ceramic substrates that are to be layered are stacked, a predetermined load is applied, and heat is applied in a non-oxidizing atmosphere to bond the ceramic substrates to each other. It would be preferable for the load to be at least 5 kPa. With a load of less than 5 kPa, either the bonding strength will be inadequate or bonding defects will tend to form.

There are no special restrictions on the heating temperature used for bonding as long as it is a temperature that provides adequate adhesion of the ceramic substrates via the bonding layers, but it would be preferable for the temperature to be at least 1500 deg C. With a temperature of less than 1500 deg C., an adequate bonding strength is difficult to obtain and bonding defects tend to occur. It would be preferable for nitrogen or argon to be used in the non-oxidizing atmosphere for degreasing and bonding.

A layered ceramic sintered body forming a heater of a wafer support body can be obtained as described above. Also, instead of using conductive paste for the electrical circuit, it would be possible, for example, in the case of a heater circuit, to use a molybdenum wire (coil) or, in the case of an electrostatic chuck electrode or RF electrode or the like, a molybdenum or tungsten mesh can be used.

In such cases, the molybdenum coil or mesh can be embedded in the raw AlN powder and hot-pressing can be performed. The temperature and atmosphere for the hot-pressing can be the same as the sintering temperature and atmosphere for AlN as described above, but it would be preferable for the hot-press pressure to be at least 1.0 MPa. With a pressure of less than 1.0 MPa, gaps form between the molybdenum coil or mesh and the AlN, reducing its performance as a heater.

Next, the co-firing method will be described. The raw slurry described above is used to form sheets using the doctor blade method. There are no special restrictions on the forming of sheets, but it would be preferable for the sheets to be no thicker than 3 mm after drying. If the sheet thickness exceeds 3 mm, the drying shrinkage of the slurry increases, increasing the probability that fissures will form in the sheets.

A metal layer that will serve as an electrical circuit having a predetermined shape on the sheet as described above is formed by applying a conductive paste using screen-printing or the like. The conductive paste can be the same as that which was described in the post-metallizing method. However, in the co-firing method, not adding oxide powder to the conductive paste is acceptable.

Next, a sheet on which a circuit is formed is stacked on a sheet on which no circuit is formed. This stacking is performed by setting up each sheet at a predetermined position and layering the sheets. Solvent can be applied between the sheets if necessary. If necessary, heat is applied in the stacked state. If heat is to be applied, it would be preferable for the heating temperature to be no more than 150 deg C. If a temperature that exceeds this is applied, the stacked sheets will be significantly deformed. Then, pressure is applied to the stacked sheets to integrate the sheets.

It would be preferable for the applied pressure to be in the range of 1-100 MPa. If the pressure is less than 1 MPa, the integration of the sheets will be inadequate, which can lead to peeling in subsequent steps. Also, if a pressure exceeding 100 MPa is applied, there will be too much sheet deformation.

As in the post-metallizing method described above, this layered body is degreased and sintered. The degreasing and sintering temperatures, amounts of carbon, and the like, are the same as those in the post-metallizing method. When printing conductive paste to the sheets, an electrical heater having multiple electrical circuits can be easily produced by printing heater circuits and electrostatic chuck electrodes and the like on separate sheets and stacking these sheets. By doing this, a layered ceramic sintered body forming the heater of a wafer support can be obtained.

If an electrical circuit such as a heat-generating body circuit is formed on the outermost layer of the layered ceramic body, an insulative coat can be formed on the electrical circuit as in the post-metallizing method in order to provide insulation and protection of the electrical circuit.

The obtained layered ceramic sintered body is processed as needed. Generally, in the sintered state, the precision demanded in semiconductor fabrication devices will often not be achieved. For the processing precision, for example, it would be preferable for the flatness of the mounting surface to be no more then 0.5 mm and more preferable no more than 0.1 mm. If the flatness exceeds 0.5 mm, gaps tend to form between the wafer and the wafer support body, preventing uniform transmission of the heat from the wafer support body to the wafer, resulting in a tendency for the wafer to have uneven temperature.

Also, it would be preferable for the surface roughness of the wafer support surface to have an Ra of no more than 5 microns. If the Ra exceeds 5 microns, friction between the wafer support body and the wafer can lead to significant loosening of grains of AlN. When this happens, the dropped grains become particles that hinder operations on the wafer such as film formation and etching. Furthermore, it would be preferable for the surface roughness to have an Ra of no more than 1 micron.

A heater for the wafer support body can be made as described above. The support body is then attached to the heater. There are no special restrictions used in the support body as long as it has a thermal expansion coefficient that is not significantly different from that of the ceramics of the heater, but it would be preferable for the difference in the thermal expansion coefficient of the heater to be no more than $5 \times 10^{-6}$/K.

If the thermal expansion coefficient difference exceeds $5 \times 10^{-6}$/K, cracks and the like can take place during attachment where the heater and the support connect. Even if cracks do not form during bonding, the bond will undergo thermal cycles as a result of repeated use, which can lead to splits and cracks. For example, if the heater is formed from AlN, it would be optimal for the support to be formed from AlN, but it would also be possible for the support to be formed from silicon nitride, silicon carbide, mullite, or the like.

Attachment is performed by bonding by way of a bonding layer. It would be preferable for the bonding layer to be formed from AlN and $Al_2O_3$ and a rare-earth oxide. These components have good wettability with regard to ceramics such as AlN used in the heater and support, providing a relatively high bonding strength and making it easy to obtain a tightly sealed bonding surface.

It would be preferable for the flatnesses of the bonding surfaces of the support and the heater to be no more than 0.5 mm. If this is exceeded, gaps tend to form at the bonding surfaces, making it difficult to obtain a bond having an adequate tight seal. It would be more preferable for the flatnesses to be no more than 0.1 mm. It would be especially preferable if the flatness of the bonding surface of the heater is no more than 0.02 mm. Also, it would be preferable for the surface roughnesses of the bonding surfaces to have an Ra of no more than 5 microns. If the Ra exceeds this, gaps tend to form at the bonding surface. It would be more preferable for the surface roughness to have an Ra of no more than 1 micron.

Next, electrodes are attached to the heater. This attachment can be performed using well-known methods. For example, counter-sinking can be performed from the side opposite from the wafer support surface of the heater to the electrical circuit, and electrodes such as molybdenum or tungsten can be connected to the electrical circuit either by metallizing or by directly using active-metal brazing filler without metallizing. Oxidation resistance can be improved if necessary by plating the electrodes.

Finally, a ring-shaped groove is formed around the bonding section of the heater and the support and outward therefrom.

A wafer support for semiconductor fabrication devices can be made as described above. The ring-shaped groove can be formed earlier on the unbaked shaped body and can be formed before the support is bonded.

Also, the wafer support of the present invention can be installed in a semiconductor device to process a semiconductor wafer. The wafer support of the present invention provides a highly reliable bond between the heater and the support, making it possible to process semiconductor wafers in a stable manner over a long period of time.

FIRST EMBODIMENT

Six types of raw aluminum nitride powder containing bismuth and chlorine were prepared. For each aluminum nitride powder, the average grain size was 0.6 microns and the specific surface area was 3.4 $m^2/g$. To the aluminum nitride (AlN) powder, 0.7 percent by weight of yttrium oxide was added, an acrylic binder and organic solvent were added, and mixing was performed with a ball mill for 24 hours to form slurries. The slurries were spray-dried to form granulated powder. This powder was shaped in a press, degreased in a nitrogen atmosphere at 700 deg C., and sintered in a nitrogen atmosphere at 1850 deg C., to form AlN sintered bodies. The amounts of bismuth and chlorine in the AlN sintered bodies are as shown in Table 1.

The completed AlN sintered bodies were machined to a diameter of 330 mm and a thickness of 15 mm. Next, for the resistance heating body, 1 percent by weight of $Y_2O_3$ was added to W powder having an average grain size of 2.0 microns, and then binder and solvent were added to form a W paste. Mixing was performed using a pot mill and a three-roll mill. The W paste was screen-printed onto the AlN sintered bodies to form heater circuit bodies.

The AlN sintered bodies printed with heater circuits were degreased in a nitrogen atmosphere at 800 deg C., and the heater circuits were baked in a nitrogen atmosphere at 1830 deg C. An organic solvent and binder were added to a $ZnO—B_2O_3—SiO_2$ powder to form a paste, which was screen-printed with a thickness of 200 microns over the entire surfaces on which the heater circuits were formed in order to protect the heater circuits. These were degreased in the open air at 350 deg C. and then baked in a nitrogen atmosphere at 700 deg C. to form a protective layer.

Next, the surfaces opposite from the surfaces on which the heater circuits were formed (wafer support surfaces) were abraded and finished to a thickness of 14 mm and a flatness of 50 microns. Countersinking was performed from the surface opposite from the wafer support surface to the heater circuit, exposing a section of the heater circuit. Mo electrodes were screwed to the exposed heater circuit sections.

A temperature measurement wafer with 17 measurement points and a diameter of 300 mm was mounted on the wafer support surfaces of the wafer supports, the heaters were turned on and heat was applied so that the temperature at the center of the temperature measurement wafer reached 180 deg C. The temperature distribution was measured as the difference between the maximum value and the minimum value of the 17 temperature measurements at that time. Then, after measurement, the wafer supports were broken and the cross-sections were inspected under an SEM microscope to study the maximum diameters of pores contained inside and the numbers of pores. This was done by observing 20 random points at a zoom of 100× and studying the pores. The results are shown in Table 1.

TABLE 1

| No. | Bi content in raw powder (ppm) | Cl content in raw powder (ppm) | Bi content in sintered body (ppm) | Cl content in sintered body (ppm) | Temperature distribution (deg C.) | Maximum pore diameter (microns) | Number of pores |
| --- | --- | --- | --- | --- | --- | --- | --- |
| 1 | 15 | 20 | 4 | 7 | 0.34 | 3 | 3 |
| 2 | 50 | 35 | 16 | 13 | 0.35 | 3 | 3 |
| 3 | 100 | 300 | 29 | 99 | 0.37 | 3 | 4 |
| 4 | 200 | 300 | 71 | 98 | 0.58 | 13 | 12 |
| 5 | 100 | 400 | 29 | 141 | 0.61 | 14 | 10 |
| 6 | 420 | 550 | 146 | 185 | 0.78 | 21 | 18 |

As Table 1 shows, if the bismuth content is the aluminum nitride sintered body is no more than 30 ppm and the chlorine content is no more than 100 ppm, the number of pores is low, the maximum pore diameter is small, superior temperature distribution is provided.

SECOND EMBODIMENT

Using the six type of raw aluminum nitride powder from the first embodiment, slurries were prepared as in the first embodiment except that 1 percent by weight of yttrium oxide was added. The slurries were formed into sheets using the doctor blade method. Next, ethylene cellulose serving as a binder and an organic solvent were added to W powder having an average grain size of 2.0 microns, and the results were mixed to form a W paste. This W paste was screen-printed onto the AlN sheets to form heater circuit patterns. Then, multiple sheets were stacked so that the thickness after sintering would be 15 mm, resulting in layered bodies. These layered bodies were degreased at a temperature of 800 deg C. in a nitrogen atmosphere and then baked in a nitrogen atmosphere at 1880 deg C., resulting in AlN sintered bodies. As in the first embodiment, these were finished to wafer supports with thicknesses of 14 mm and wafer support surfaces having flatness of 50 microns. Evaluations were performed in the same manner as in the first embodiment.

The results are shown in Table 2.

TABLE 2

| No. | Bi content in raw powder (ppm) | Cl content in raw powder (ppm) | Bi content in sintered body (ppm) | Cl content in sintered body (ppm) | Temperature distribution (deg C.) | Maximum pore diameter (microns) | Number of pores |
| --- | --- | --- | --- | --- | --- | --- | --- |
| 7 | 15 | 20 | 3 | 6 | 0.35 | 3 | 2 |
| 8 | 50 | 35 | 15 | 13 | 0.35 | 2 | 4 |
| 9 | 100 | 300 | 28 | 94 | 0.38 | 3 | 5 |
| 10 | 200 | 300 | 66 | 93 | 0.60 | 16 | 11 |
| 11 | 100 | 400 | 27 | 129 | 0.65 | 13 | 13 |
| 12 | 420 | 550 | 130 | 167 | 0.77 | 24 | 17 |

As Table 2 shows, even with the co-firing method, if the bismuth content is no more than 30 ppm and the chlorine content is no more than 100 ppm, the number of pores is low, the maximum pore diameter is small, and temperature distribution is superior. Also, since the sintering temperature was higher compared to that used in the first embodiment, the contents of these elements were lower compared to the first embodiment.

THIRD EMBODIMENT

The six types of raw aluminum nitride from the first embodiment were used and slurries were formed as in the first embodiment except that 3 percent by weight of yttrium oxide was added. The slurries were granulated.

Next, the granules were pressed and grooves were formed in the shaped bodies. Mo coils having a diameter of 4 mm were embedded in these grooves to form heater circuits. Then, the grooves holding the Mo coils were filled with the AlN granules described above, and pressing was formed so that the thickness after sintering would be 15 mm. Hot-pressing was performed on the shaped bodies and AlN sintered bodies were formed by sintering in a nitrogen atmosphere at 1900 deg C. under a load of 10 MPa. As in the first embodiment, these were finished to form wafer supports having 14 mm thickness and 50 micron flatness for the wafer support surfaces. Evaluations were performed as in the first embodiment. The results are shown in Table 3.

As Table 3 shows, even if an Mo coil is used as the heat-generating body, if the bismuth content is no more than 30 ppm and the chlorine content is no more than 100 ppm, the number of pores is low, the maximum pore diameter is small, and the temperature distribution is superior.

FOURTH EMBODIMENT

The six types of raw aluminum nitride powder from the first embodiment were used and slurries were formed as in the first embodiment except that 1.5 percent by weight of yttrium oxide was added. The slurries were granulated, and the granules were pressed, degreased at 800 deg C. in a nitrogen atmosphere, and sintered in a nitrogen atmosphere at 1850 deg C. to form AlN sintered bodies. The AlN sintered bodies were cut into 10 mm cubes and the 10 mm×10 mm surfaces were polished with diamond abrasive to a mirror finish, and the surface roughness (Ra) was measured.

Then, a corrosion resistance test was performed for 100 hours on the AlN sintered bodies in a $CF_4$ atmosphere at a temperature of 500 deg C. After the corrosion resistance test, surface roughness was measured again. For the surface roughness, 10 points were measured and the average was taken. The results are shown in Table 4.

TABLE 3

| No. | Bi content in raw powder (ppm) | Cl content in raw powder (ppm) | Bi content in sintered body (ppm) | Cl content in sintered body (ppm) | Temperature distribution (deg C.) | Maximum pore diameter (microns) | Number of pores |
| --- | --- | --- | --- | --- | --- | --- | --- |
| 13 | 15 | 20 | 4 | 6 | 0.37 | 4 | 3 |
| 14 | 50 | 35 | 14 | 12 | 0.38 | 3 | 5 |
| 15 | 100 | 300 | 27 | 93 | 0.40 | 5 | 7 |
| 16 | 200 | 300 | 63 | 91 | 0.67 | 21 | 14 |
| 17 | 100 | 400 | 25 | 122 | 0.75 | 22 | 15 |
| 18 | 420 | 550 | 124 | 159 | 0.88 | 28 | 21 |

TABLE 4

| No. | Bi content in raw powder (ppm) | Cl content in raw powder (ppm) | Bi content in sintered body (ppm) | Cl content in sintered body (ppm) | Ra before corrosion resistance test (microns) | Ra after corrosion resistance test (microns) |
|---|---|---|---|---|---|---|
| 19 | 15 | 20 | 5 | 7 | 0.10 | 0.24 |
| 20 | 50 | 35 | 17 | 15 | 0.10 | 0.27 |
| 21 | 100 | 300 | 30 | 100 | 0.10 | 0.32 |
| 22 | 200 | 300 | 72 | 99 | 0.10 | 0.89 |
| 23 | 100 | 400 | 31 | 143 | 0.10 | 0.98 |
| 24 | 420 | 550 | 149 | 189 | 0.11 | 1.13 |

As shown in Table 4, if the bismuth content is no more than 30 ppm and the chlorine content is no more than 100 ppm, superior corrosion resistance is provided.

INDUSTRIAL APPLICABILITY

According to the present invention, by using at least predetermined amounts of bismuth and chlorine in an aluminum nitride sintered body, it is possible to minimize the presence of pores in the aluminum nitride sintered body.

A ceramic heater in which a resistance heating body is formed on an aluminum nitride sintered body with minimal pores provides superior thermal uniformity. Also, aluminum nitride sintered bodies with minimal pores provide superior corrosion resistance. By using this type of aluminum nitride sintered body in semiconductor fabrication devices as semiconductor heating parts, it is possible to provide high thermal uniformity and reliability without having performance decrease over long periods of time.

What is claimed is:

1. An aluminum nitride sintered body comprising:
    aluminum nitride as the primary component of the sintered body;
    bismuth in said aluminum nitride sintered body is between 4 ppm and 30 ppm; and
    chlorine in said aluminum nitride sintered body is between 4 ppm and 100 ppm.

2. An aluminum nitride sintered body according to claim 1 wherein said aluminum nitride sintered body is used as a semiconductor heating part.

3. An aluminum nitride sintered body according to claim 1 wherein a resistance heating body is formed on said aluminum nitride sintered body.

4. An aluminum nitride sintered body according to claim 3 wherein said aluminum nitride sintered body is used as a semiconductor heating part.

* * * * *